United States Patent
Antonioli et al.

(10) Patent No.: US 11,671,875 B2
(45) Date of Patent: Jun. 6, 2023

(54) METHODS, DATA SPLIT UNIT AND DATA COLLECTOR UNIT FOR CONTROLLING DATA TRANSMISSION OVER TWO CONNECTIONS

(71) Applicant: Telefonaktiebolaget LM Ericsson (publ), Stockholm (SE)

(72) Inventors: Roberto Pinto Antonioli, Fortaleza (BR); Igor Moaco Guerreiro, Fortaleza Ceará (BR); Emanuel Bezerra Rodrigues, Fortaleza (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 254 days.

(21) Appl. No.: 17/276,359

(22) PCT Filed: Sep. 18, 2018

(86) PCT No.: PCT/SE2018/050948
§ 371 (c)(1),
(2) Date: Mar. 15, 2021

(87) PCT Pub. No.: WO2020/060453
PCT Pub. Date: Mar. 26, 2020

(65) Prior Publication Data
US 2022/0046475 A1    Feb. 10, 2022

(51) Int. Cl.
*H04W 28/12* (2009.01)
*H04W 28/08* (2023.01)
(Continued)

(52) U.S. Cl.
CPC ........... *H04W 28/12* (2013.01); *H04W 28/08* (2013.01); *H04W 28/0846* (2020.05);
(Continued)

(58) Field of Classification Search
CPC ..... H04W 28/12; H04W 88/06; H04W 88/10; H04W 28/09; H04W 28/0933; H04L 45/24; H04L 47/125
See application file for complete search history.

(56) References Cited

U.S. PATENT DOCUMENTS

| | | | |
|---|---|---|---|
| 7,327,676 B2* | 2/2008 | Teruhi | H04L 47/2416 370/468 |
| 2003/0174733 A1* | 9/2003 | Kawai | H04L 45/24 370/498 |

(Continued)

FOREIGN PATENT DOCUMENTS

| | | |
|---|---|---|
| EP | 1429573 A1 | 6/2014 |
| EP | 3174327 A1 | 5/2017 |

(Continued)

OTHER PUBLICATIONS

Huawei, et al., "Performance evaluation of user throughput enhancement with Multi-Stream Aggregation over non-deal backhaul", 3GPP TSG-RAN WG2 Meeting #83 R2-132833, Barcelona, Spain, Aug. 19-23, 2013, 1-6.

(Continued)

*Primary Examiner* — Mandish K Randhawa
(74) *Attorney, Agent, or Firm* — Murphy, Bilak & Homiller, PLLC

(57) ABSTRACT

Methods, a data split unit (200) and a data collection unit (202), for controlling data transmission over two connections used for communication of data from the data split unit to the data collection unit operating in dual connection mode. The data split unit obtains (2:4) a receive split ratio between the two connections as perceived at the data collection unit, and adapts (2:5) a transmit split ratio for distributing data over the two connections based on the receive split ratio. The transmit split ratio may be adapted to reduce or eliminate a difference between the transmit split (Continued)

ratio and the receive split ratio. The transmission of data is then distributed (2:7A,B) over the two connections according to the adapted transmit split ratio.

20 Claims, 6 Drawing Sheets

(51) Int. Cl.
 *H04W 88/06* (2009.01)
 *H04W 88/10* (2009.01)
(52) U.S. Cl.
 CPC ........ *H04W 28/0933* (2020.05); *H04W 88/06* (2013.01); *H04W 88/10* (2013.01)

(56) References Cited

U.S. PATENT DOCUMENTS

| | | |
|---|---|---|
| 2015/0326456 A1 | 11/2015 | Dudda et al. |
| 2016/0157155 A1 | 6/2016 | Chiba et al. |
| 2018/0206282 A1* | 7/2018 | Singh ............... H04W 76/15 |
| 2019/0098621 A1* | 3/2019 | Hong ............... H04W 72/21 |

FOREIGN PATENT DOCUMENTS

| | | |
|---|---|---|
| EP | 3457783 A1 | 3/2019 |
| WO | 2015048287 A1 | 4/2015 |
| WO | 2015155598 A2 | 10/2015 |
| WO | 2015167546 A1 | 11/2015 |
| WO | 2016064499 A1 | 4/2016 |
| WO | 2017005478 A1 | 1/2017 |
| WO | 2017011026 A1 | 1/2017 |
| WO | 2017076826 A1 | 5/2017 |
| WO | 2017195471 A1 | 11/2017 |

OTHER PUBLICATIONS

Intel Corporation, "Throughput evaluation and comparison of with and without UP bearer split", 3GPP TSG RAN NG2 Meeting #83, R2-132859, Barcelona, Spain, Aug. 19-23, 2013, 1-8.
Jin, Boram, et al., "Aggregating LTE and Wi-Fi: Toward Intra-Cell Fairness and High TCP Performance", IEEE Transactions on Wireless Communications, vol. 16, No. 10, Oct. 2017, 6295-6308.
Pan, Meng-Shiuan, et al., "Downlink Traffic Scheduling for LTE-A Small Cell Networks With Dual Connectivity Enhancement", IEEE Communications Letters, vol. 20, No. 4, Apr. 2016, 796-799.
Wang, Hua, et al., "Dual connectivity for LTE-advanced heterogeneous networks", Wireless Networks, vol. 22, Issue 4, Springer, May 2016, 3115-1328.

* cited by examiner

METHODS, DATA SPLIT UNIT AND DATA COLLECTOR UNIT FOR CONTROLLING DATA TRANSMISSION OVER TWO CONNECTIONS

TECHNICAL FIELD

The present disclosure relates generally to methods, a data split unit and a data collector unit, for controlling data transmission over two connections used for communication of data from the data split unit to the data collection unit when the data collection unit is operating in dual connection mode.

BACKGROUND

In the field of data communication, communication units and devices have been developed as to be capable of receiving data from two different connections or "bearers" at the same time, commonly referred to as dual connectivity, DC, which means that the receiving unit thus operates in dual connection mode. Different communication technologies may be used in the two connections which may include a Radio Access technology, RAT, for one connection and a fixed "legacy" access technology for the other connection.

This capability of DC can be utilized by distributing the data between the two connections in an efficient and economic manner, e.g. depending on the current capacity and/or performance of the respective connections. For example, if one connection is over a wireless network and the other connection is over a fixed network, it may be useful to offload the wireless network in case of high load and/or bad radio conditions, by transmitting more of the data on the fixed connection instead. In another example, the first connection may use wireless LTE technology and the second connection may use wireless 5G technology, e.g. including features such as beamforming and Multiple Input Multiple Output, MIMO. In the case of two wireless connections the data may be transmitted over both connections from the same network node or base station being capable of using both LTE and 5G technologies. In another example, the first connection may use a cellular or mobile network and the second connection may be a WiFi broadband connection.

In this description, the distribution of transmitted data traffic between two connections when dual connectivity is employed is referred to as a "transmit split ratio" which can vary between 0 when all data goes over one connection and 1 when all data goes over the other connection. A transmit split ratio of 0.5 thus means that the data traffic is split equally between the two connections, which could also be described as 50-50 in terms of percentages.

As indicated above, it may be efficient and helpful to control the distribution of data over the two connections to generally achieve the best possible performance, e.g. in terms of high quality, low latency and low cost. It may also be desirable to offload one of the connections by directing more of the data traffic to the other connection. Such control of the transmit split ratio may be implemented at a "data split unit" where the data is split over the two connections.

Depending on which technologies are used for the two connections, the data split unit may reside in a base station or in a higher node of a wireless network in case both connections are provided by the same network. In another example, the data split unit may reside in a so-called Next Generation Central Office, NGCO, which distributes the data traffic between a wireless 5G/NG network and a Legacy Fixed Network, LFN. In yet another example, the data split unit may reside in a so-called Customer Premises Equipment, CPE, which distributes the data traffic between a 3GPP connection and a WiFi connection to a User Equipment, UE, e.g. in a home or other private environment. Further examples will be described later below.

It may sometimes be convenient to use a fixed transmit split ratio so that a first fixed percentage of the data goes over one connection and a second fixed percentage of the data goes over the other connection, the sum of the first and second percentages thus being 100%. These fixed percentages may have been calculated and/or tested in beforehand to achieve the best possible overall result in several different situations and conditions.

However, to achieve the above-described flexible control of the transmit split ratio so that it can be adapted to current conditions, it is according to current solutions necessary to get certain performance related parameters from at least one of the connections, and use them as input to some kind of Flow Control Algorithm, FCA, which thus determines the transmit split ratio to a value more or less optimal for current conditions. This approach requires measurement and reporting of several such performance related parameters which in addition typically change rapidly over time so that the measurements and resulting transmit split ratio quickly become irrelevant and must therefore be updated frequently. It is thus a problem that substantial signaling and processing are required in conventional solutions to achieve an up-to-date optimal distribution of data when dual connectivity is employed, particularly when the conditions may change rapidly in one or both of the connections.

Some examples of how an FCA may be employed for a receiving entity in dual connection are described in 3GPP contribution R2-132859: "Throughput evaluation and comparison of with and without UP bearer split", 3GPP, 2013-08, and in 3GPP contribution R2-132833: "Performance evaluation of user throughput enhancement with multi-stream aggregation over non-ideal backhaul", 3GPP, 2013-08.

SUMMARY

It is an object of embodiments described herein to address at least some of the problems and issues outlined above. It is possible to achieve this object and others by using methods, a data split unit and a data collection unit as defined in the attached independent claims.

According to one aspect, a method is provided for controlling data transmission over two connections used for communication of data from a data split unit to a data collection unit operating in a dual connection mode.

In this method, a receive split ratio R-Rx between the two connections as perceived at the data collection unit during the data communication is obtained. Then, a transmit split ratio R-Tx for distributing data transmission over the two connections is adapted based on the obtained receive split ratio, and transmission of data to the data collection unit is distributed over the two connections according to the adapted transmit split ratio R-Tx.

According to another aspect, a data split unit is arranged to control data transmission over two connections used for communication of data from the data split unit to a data collection unit operating in a dual connection mode. The data split unit is configured to obtain a receive split ratio R-Rx between the two connections as perceived at the data collection unit during the data communication. The data split unit is further configured to adapt a transmit split ratio R-Tx for distributing data transmission over the two connections based on the obtained receive split ratio, and to distribute transmission of data to the data collection unit over the two connections according to the adapted transmit split ratio R-Tx.

According to another aspect, a method is performed in a data collection unit, for assisting control of data transmission of data from a data split unit over two connections to the data collection unit operating in a dual connection mode. In this method, the data collection unit receives a transmit split ratio R-Tx currently used for distributing data transmission over the two connections. The data collection unit also measures a receive split ratio R-Rx between the two connections as perceived at the data collection unit during the data communication, and reports the receive split ratio R-Rx to the data split unit, depending on the received transmit split ratio R-Tx, as a basis for adapting said transmit split ratio R-Tx.

According to another aspect, a data collection unit is arranged to assist control of data transmission of data from a data split unit over two connections to the data collection unit operating in a dual connection mode. The data collection unit is configured to receive a transmit split ratio R-Tx currently used for distributing data transmission over the two connections. The data collection unit is further configured to measure a receive split ratio R-Rx between the two connections as perceived at the data collection unit during the data communication, and to report the receive split ratio R-Rx to the data split unit, depending on the received transmit split ratio R-Tx, as a basis for adapting said transmit split ratio R-Tx.

When using either of the above methods and unit, in is an advantage that the transmit split ratio can be more easily and rapidly adapted to current conditions in the two connections by only requiring that the receive split ratio is reported from the data collection unit to the data split unit. The transmit split ratio may then simply be set equal to the reported receive split ratio. It is thus not necessary to frequently signal various performance related parameters as input to an FCA or the like, nor to process such parameters.

To further reduce the signaling, the receive split ratio R-Rx may be reported only when a difference between the measured R-Rx and the transmit split ratio R-Tx is above a minimum threshold d. If not, it may be concluded that the current transmit split ratio R-Tx is correct and can be continually used without any new adaptation.

The above methods and units may be configured and implemented according to different optional embodiments to accomplish further features and benefits, to be described below.

A computer program is also provided comprising instructions which, when executed on at least one processor in either of the above data split unit and data collection unit, cause the at least one processor to carry out the method described above. A carrier is also provided which contains the above computer program, wherein the carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Figure 1:
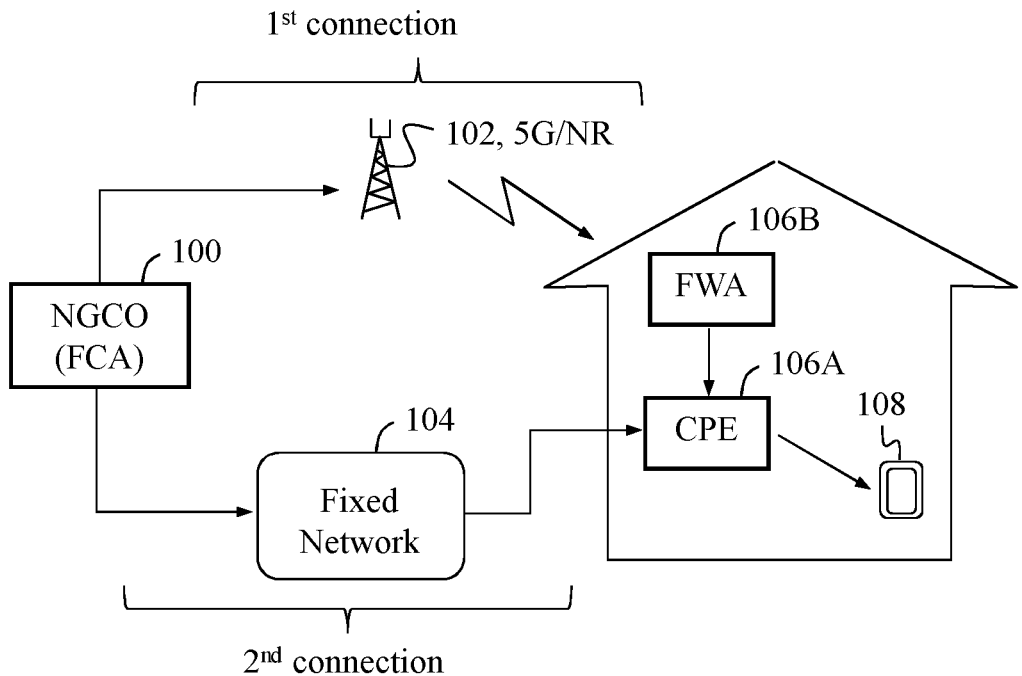
FIG. 1 is a communication scenario illustrating how data can be transmitted over two connections, including a 5G/NR wireless network and a fixed network, to a data collection unit in dual connection mode.

Briefly described, a solution is provided to substantially facilitate adaptation of the transmit split ratio to current conditions in two connections between a data split unit and a data collection unit, by only requiring that the data collection unit reports a perceived receive split ratio to the data split unit as a basis for adapting the transmit split ratio, e.g. by setting it equal to the reported receive split ratio. Thereby, it is not necessary to signal any other performance related parameters between the data collection unit and the data split unit, nor to process such parameters.

The above characteristics can be achieved when the data split unit obtains a receive split ratio between the two connections as perceived at the data collection unit which may report its perceived, i.e. measured, receive split ratio to the data split unit. The receive split ratio can for example be measured as a ratio between a measured data throughput on one connection and a measured data throughput on the other connection. Having obtained the receive split ratio, the data split unit then uses it as a basis for adapting the transmit split ratio, for example such that any difference between the transmit split ratio and the receive split ratio is reduced or eliminated which means that the transmit split ratio is set more or less equal to the receive split ratio.

To generalize the adaptation operation, the transmit split ratio may be adapted by applying a predefined function f(.) on the obtained receive split ratio, which function may for example require that the transmit split ratio should be equal to the receive split ratio. The transmission of data is then distributed over the two connections according to the adapted transmit split ratio. If the currently used transmit split ratio is already substantially equal to the receive split ratio, the transmit split ratio can of course remain the same so that the "adaptation" is in this case merely a confirmation that the current transmit split ratio is still valid.

This procedure can provide a favorable and even optimal distribution of data between the two connections since the reported receive split ratio and its deviation (if any) from the currently applied transmit split ratio may be used as an indication of how well the two connections work. To explain this further, assume that the current transmit split ratio is 50-50, i.e. the data transmission is distributed equally on the two connections, a significantly different receive split ratio of, say, 20-80 would indicate that there is some problem with one of the connections since it can only deliver 20% of the data instead of the 50% that was transmitted. For example, the problematic connection may currently experience insufficient capacity, bad radio conditions, many retransmissions, high traffic load, equipment malfunction, or whatever applicable. It should be noted that one or several of the above factors may change rapidly thus entailing fast adaption of the transmit split ratio.

The solution can in this case be applied by adapting the transmit split ratio so that it equals or at least approaches the receive split ratio of 20-80, such that the problematic connection is offloaded and data is redirected to the other presumably less problematic connection, thereby potentially resulting in improvements such as increased total throughput, reduced latency, higher quality, reduced network load, to mention a few non-limiting but illustrative examples.

There are also other advantages of the above solution compared to conventional procedures for adaptation of the transmit split ratio, including notably less signaling since only one parameter, the receive split ratio, needs to be reported to the data split unit. Another advantage is much simpler processing since the transmit split ratio to use can easily and rapidly be determined based on the receive split ratio and it is not necessary to execute any FCA each time the transmit split ratio is to be adapted, nor to provide parameters and metrics as input thereto. It may be favorable to execute an FCA occasionally though, which can be much less frequent than in conventional solutions.

An example of how data can be transmitted over two connections between a data split unit and a data collection unit in dual connection mode, is illustrated in FIG. 1. The data split unit is in this example an NGCO 100 and the two connections include a first connection over a 5G/NR wireless network 102, here schematically shown as a network node, and a second connection over a fixed network 104. In this disclosure, 5G/NR denotes a network that is based on radio technology according to the fifth Generation, 5G, also commonly referred to as "New Radio", NR.

The two connections are terminated in a residence 106 where a CPE 106A is acting as the data collection unit. The CPE 106A is connected to the fixed network 104 for receiving data on the first connection and also to a Fixed Wireless Access, FWA, user equipment 106B which is capable of receiving radio signals from the 5G/NR wireless network 102 and thereby to receive data on the second connection. The data collected from the two connections 102, 104 may then be locally transmitted by the CPE 106A to a user device 108 which thus terminates the communication of data from a data source, not shown, delivering data to the NGCO. The above-described solution of adapting the transmit split ratio at a data split unit based on the receive split ratio reported by a data collection unit, may be applied in the communication scenario depicted in FIG. 1 and also in other communication scenarios which will be described further below. In the following, the transmit split ratio is denoted R-Tx and the receive split ratio is denoted R-Rx for short.

Figure 1A:
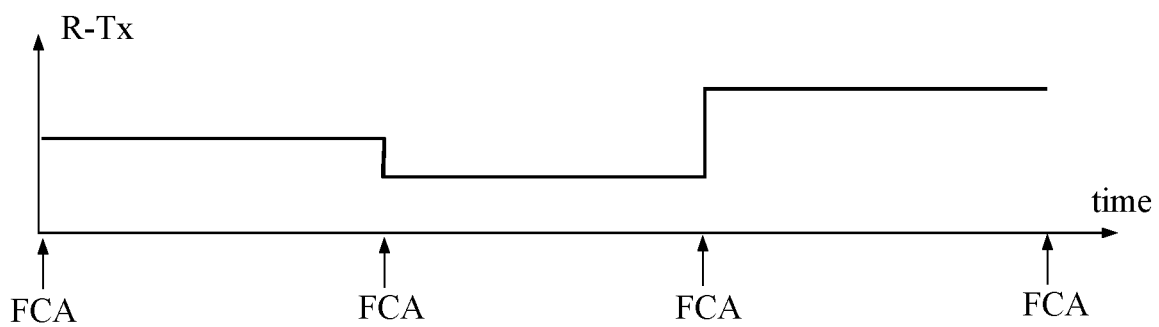
FIG. 1A is a diagram illustrating how a Flow Control Algorithm, FCA, can be used to control a transmit split ratio, according to the prior art.

FIG. 1A illustrates how an FCA needs to be executed at regular intervals according to prior solutions, as a basis for adapting the R-Tx at a data split unit. It can be seen that the R-Tx is changed (adapted) only after execution of the FCA and it remains constant throughout between the FCA executions. Since an FCA requires estimation and reporting of several performance related parameters or metrics to the data split unit, such as buffer size, delays, average packet rate, queue size, which may need to be calculated or estimated as such, the FCA becomes quite complex to execute and the input parameters or metrics also take some time to obtain. As a result, the FCA can only be executed after a considerable waiting time since the last FCA execution which means that some of the input parameters may even have become out-of-date and irrelevant before the FCA has been executed, resulting in inaccurate adaptation of the R-Tx which may further become irrelevant well before the next adaptation.

In addition, certain protocols may be used for reliable transmission that adopt acknowledge messages. That is, for each transmitted data unit with reported metrics, an acknowledge message is expected to be received, and if not a retransmission must be performed. It may for example occur that some acknowledge messages are lost or corrupted, e.g. by a used uplink channel, adding further undesired delay in the reporting of metrics. Consequently, the effectiveness of these algorithms, FCAs, can be severely reduced.

Using the solution proposed herein instead will enable much faster adaptation of the R-Tx at the data split unit so that it can be updated at much shorter intervals, resulting in more accurate and up-to-date R-Tx and at lower processing costs. The amount of signaling is also significantly reduced as compared to conventional procedures, since it is only necessary to report the receive split ratio to the data split unit. The receive split ratio is also fairly simple to measure at the data collection unit and it can thus be reported quite frequently to the data split unit for accurate adaptation of the transmit split ratio, without causing too much load on the network used for said reporting. As a result, the transmit split ratio can be adapted more often than in conventional procedures requiring execution of an FCA for each adaption operation.

Figure 2:
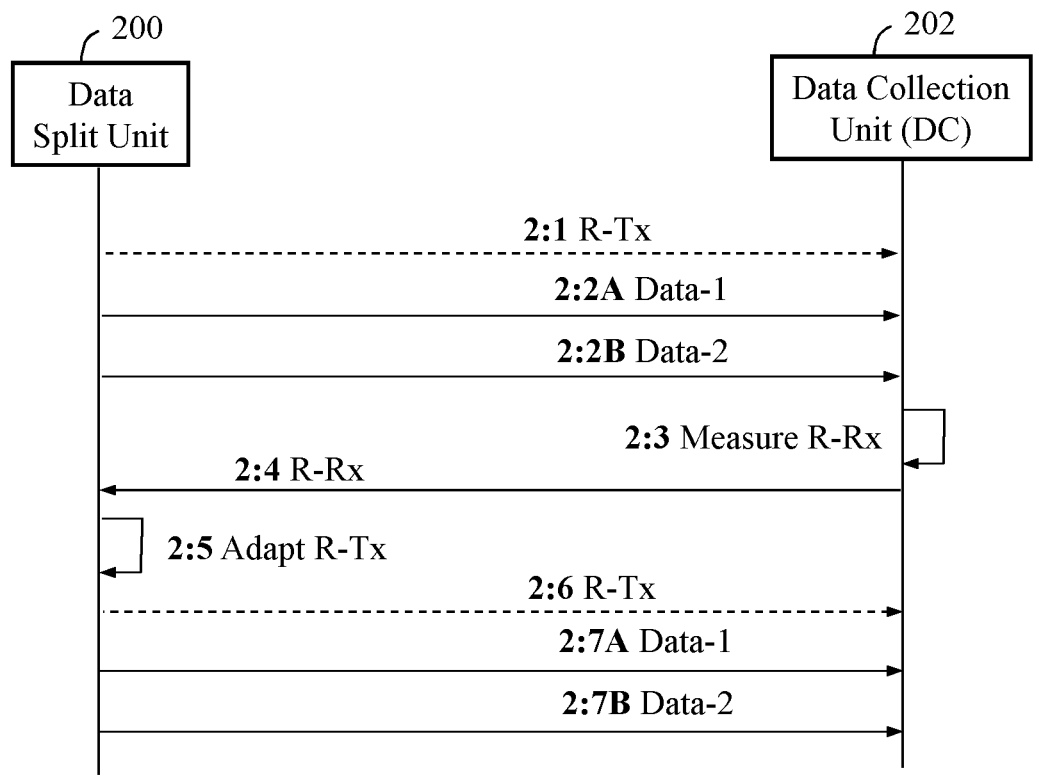
FIG. 2 is a signaling diagram illustrating an example of how the solution may be employed, according to some example embodiments.

A communication example where the solution is employed is illustrated in the signaling diagram of FIG. 2 involving a data split unit 200 and a data collection unit 202 which receives data from the data split unit 200 over two different connections, e.g. in the manner described above. The two connections are not shown in this schematic figure.

When the communication starts, the data split unit 200 may execute an FCA once, not shown, to get an R-Tx to use initially. A first action 2:1 illustrates that the data split unit 200 may send to the data collection unit 202 a transmit split ratio R-Tx that is currently used by the data split unit 200 for distributing data transmission to the data collection unit 202 over the two connections. The data collection unit 202 is thereby able to use the transmit split ratio R-Tx as a basis for deciding whether to report a receive split ratio R-Rx or not to the data split unit 200, which will be described in more detail later below. Basically, if the current R-Tx does not differ notably from the measured R-Rx, it may not be necessary or justified to report the latter, thus saving signaling.

The data split unit 200 distributes the transmission of data over the two connections according to the currently used transmit split ratio R-Tx, and in this transmission action 2:2A schematically illustrates that one portion "Data-1" is transmitted over a first connection and action 2:2B schematically illustrates that another portion "Data-2" is transmitted over a second connection. The transmit split ratio R-Tx thus dictates the ratio between Data-1 and Data-2. In this context, the term "portion" basically refers to a percentage.

For example, if R-Tx is 0.5, 50% of the total transmission is directed over the first connection and the remaining 50% of the total transmission is directed over the second connection. In another example, if R-Tx is 0.7, 70% of the total transmission could be directed over the first connection and the remaining 30% of the total transmission could be directed over the second connection. It is a matter of implementation to define whether R-Tx denotes the portion of the first connection and 1−R-Tx is the portion of the second connection, or vice versa, as long as this terminology is applied consistently.

In a next action 2:3, the data collection unit 202 measures the receive split ratio R-Rx, e.g. by measuring the throughput on each connection and calculating the ratio between the throughput measured on the first connection and the throughput measured on the second connection. The data collection unit 202 then reports the measured receive split ratio R-Rx to the data split unit 200, in a further action 2:4. This reporting may be made on one of the two connection opposite to the data direction, or on a third connection that can be used for sending such reports and possibly also other control information.

In more detail, the reporting of R-Rx may be done in action 2:4 as follows. A data bearer may be used for transmitting data on either of the two connections using a User Plane, also referred to as the Data Plane, while the R-Rx may be transmitted using a Control Plane which could be established in one or both of the two connections. For example, when the two connections involve an LTE link from an LTE base station and an NR link from an NR base station, the Control Plane is usually established using the LTE link because the LTE connection is more reliable. It is also possible to establish a third connection or data bearer to transmit control-related information in DC which could also carry data in a multiple connection scenario involving three connections.

The data split unit 200 accordingly adapts the transmit split ratio R-Tx, in a further action 2:5, based on the receive split ratio R-Rx received from the data collection unit 202 in action 2:4. The data split unit 200 may further transmit or report the newly adapted transmit split ratio R-Tx to the data collection unit 202, in a further action 2:6, which corresponds to action 2:1 above. Transmission of the transmit split ratio R-Tx to the data collection unit 202 in actions 2:1 and 2:6 may be done as the reporting of R-Rx in action 2:4, e.g. as described above, but in a reverse direction.

The final actions 2:7A and 2:7B illustrate that one (updated) portion "Data-1" is transmitted over the first connection and that another (updated) portion "Data-2" is transmitted over the second connection, respectively, as distributed by the data split unit 200 in accordance with the adapted transmit split ratio R-Tx. The process may then return to action 2:3 in order to repeat the shown "adaptation loop".

Figure 3:
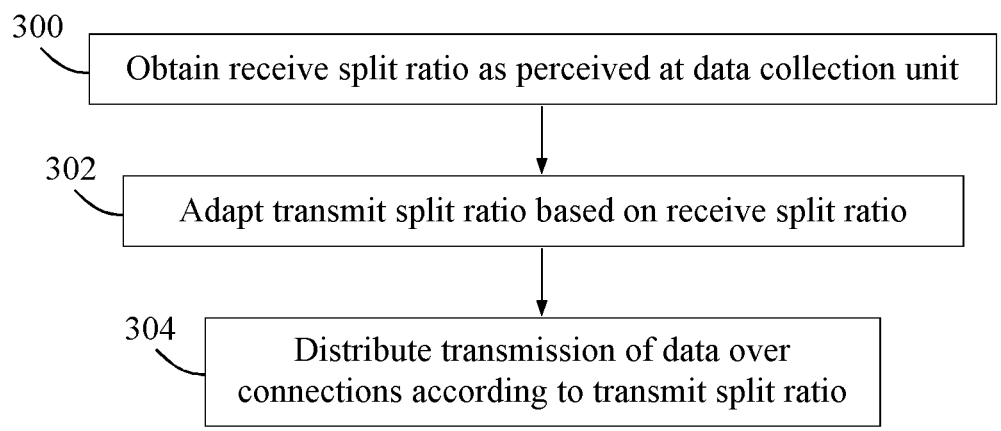
FIG. 3 is a flow chart illustrating a procedure that may be performed in a data split unit, according to further example embodiments.

An example of how the solution may be employed in terms of actions which may be performed by a data split unit such as the data split unit 200, is illustrated by the flow chart in FIG. 3 which will now be described with further reference to FIG. 2, although this procedure is not limited to the example of FIG. 2. The actions in FIG. 3 could thus be performed for controlling data transmission over two connections used for communication of data from a data split unit 200 to a data collection unit 202 operating in a dual connection mode. The actions in FIG. 3 could thus be performed by the data split unit 200 which may in turn control entities or nodes used for actually transmitting the data from a "split point" such as an NGCO as shown in FIG. 1, or a network node or base station of a wireless network, or a CPE of a private network, depending on how and where the solution is employed.

A first action 300 illustrates that the data split unit 200 obtains a receive split ratio R-Rx between the two connections as perceived at the data collection unit 202 during the data communication. This action corresponds to action 2:4 in FIG. 2. The receive split ratio R-Rx may be obtained when measured and reported by the data collection unit 202 in the manner described above.

In a next action 302, a transmit split ratio R-Tx for distributing data transmission over the two connections is adapted based on the obtained receive split ratio R-Rx, e.g. by applying a predefined function or the like on R-Rx. This action corresponds to action 2:5 in FIG. 2. A final action 304 illustrates that the data split unit 200 distributes transmission of data to the data collection unit 202 over the two connections according to the adapted transmit split ratio R-Tx, which distribution may be done by the data split unit 200 itself or by an entity controlled by the data split unit 200. This action corresponds to action 2:6 in FIG. 2.

Some further examples of embodiments that may be employed in the above procedure in FIG. 3 will now be described. In some example embodiments, the transmit split ratio may be adapted in action 302 so that a difference between the transmit split ratio R-Tx and the obtained receive split ratio R-Rx is reduced or even eliminated. For example, it may not be deemed necessary to change R-Tx if the above difference is not significant enough. Another example embodiment may thus be that the transmit split ratio is adapted only if said difference is above a minimum threshold d, which may be set in beforehand as an operational parameter.

In another example embodiment, if the receive split ratio R-Rx is below a predefined value δ or above 1−the predefined value δ, indicating that the two connections include a dominant connection on which almost all data is received and a non-dominant connection on which almost no data is received, the transmit split ratio R-Tx may be set to zero or 1, depending on how R-Tx has been defined, so that the non-dominant connection is deactivated and only the dominant connection is used. It can actually be assumed that the dominant connection is the best working connection of the two, while the non-dominant connection is likely to be subjected to some problem(s) such as bad radio conditions, high traffic load, etc., as also mentioned above.

In other words, if the reported receive split ratio R-Rx is close to 1 within a margin, i.e. the value δ, the first connection is the dominant one and the transmit split ratio R-Tx is therefore set to 1 which distributes all data to the dominant first connection. On the other hand, if R-Rx is close to 0 within the margin δ, the second connection is the dominant one and the transmit split ratio R-Tx is set to 0 which distributes all data to the dominant second connection. This embodiment will be explained in more detail later below with reference to FIG. 4A.

In another example embodiment, the transmit split ratio may be adapted by applying a predefined function f(.) on the obtained receive split ratio, which was also mentioned above. In this case, another example embodiment may be that the predefined function f(.) requires that the adapted transmit split ratio is equal to the obtained receive split ratio. The adaptation is however not limited to this simple alternative and the function f(.) could be more elaborate, e.g. by depending on other factors such as traffic load or other conditions of one or both of the connections. In another example, f(.) could be an exponential low-pass filter of the current transmit split ratio R-Tx and the reported receive split ratio R-Rx.

In a further example embodiment, the data split unit 200 may send the adapted transmit split ratio to the data collection unit 202 as a basis for deciding whether to report a next receive split ratio or not, e.g. as described above for actions 2:1 and 2:6. As mentioned above, the data collection unit 202 will then be able to decide to not report the next measured receive split ratio if it is not notably different from the current adapted transmit split ratio, thus saving signalling. Correspondingly, the data split unit 200 can refrain from sending the adapted transmit split ratio to the data collection unit 202 if it has not changed (notably) from a previously sent value.

It was mentioned above that the solution described herein may be employed in various different communication scenarios, and some are schematically illustrated in FIGS. 3A-3D, which will be referenced below in the following embodiments. These figures thus illustrate where the data split unit 200 and data collection unit may be implemented and what types of connections may be used between the units.

Figure 3A:
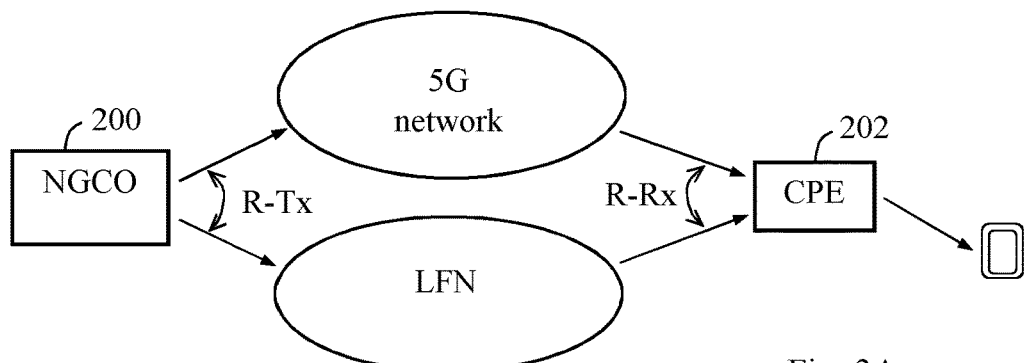
FIGS. 3A-3D illustrate 4 non-limiting examples of communication scenarios where the solution can be employed, according to further example embodiments.

In one example embodiment, the actions 300-304 may be performed when the data split unit 200 is implemented in a Next Generation Central Office, NGCO, the data collection unit 202 is implemented in a Customer Premises Equipment, CPE, and the two connections comprise a 5G radio access network and a Legacy Fixed Network, LFN. This embodiment is illustrated in FIG. 3A which also corresponds to FIG. 1.

Figure 3B:
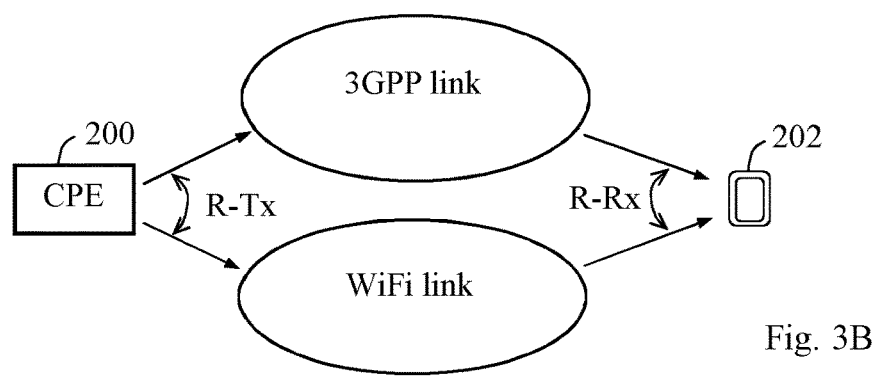

In a next example embodiment, the actions 300-304 may be performed when the data split unit 200 is implemented in a Customer Premises Equipment, CPE, the data collection unit 202 is implemented in a User Equipment, UE, and the two connections comprise a 3GPP radio link and a WiFi link. This embodiment is illustrated in FIG. 3B.

Figure 3C:
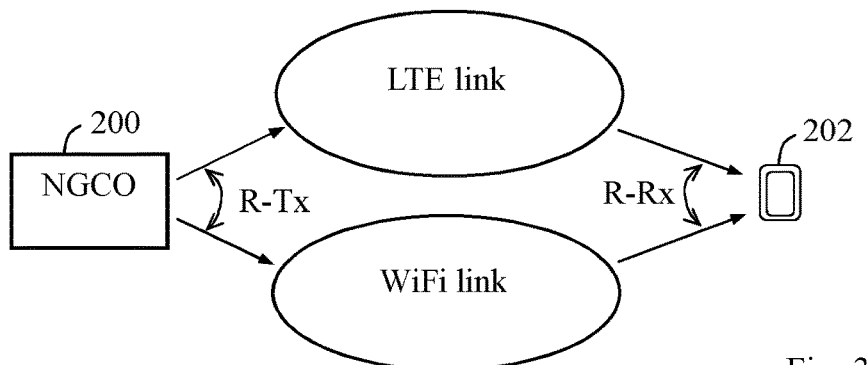

In a next example embodiment, the actions 300-304 may be performed when the data split unit 200 is implemented in a Next Generation Central Office, NGCO, the data collection unit 202 is implemented in a User Equipment, UE, and the two connections comprise an LTE radio link and a WiFi link. This embodiment is illustrated in FIG. 3C.

Figure 3D:
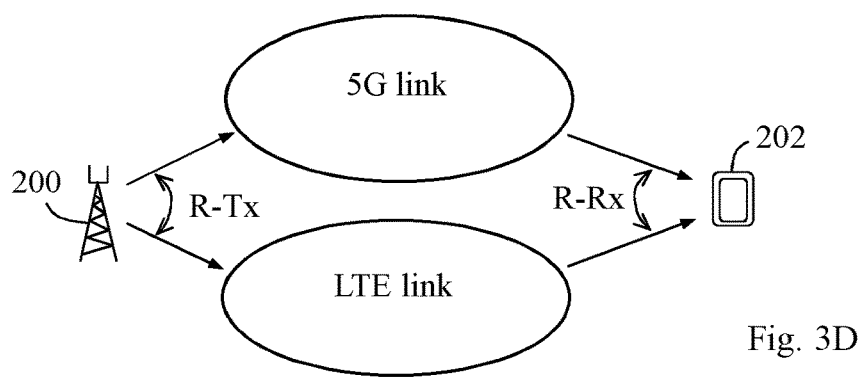

In a next example embodiment, the actions 300-304 may be performed when the data split unit 200 is implemented in a base station of a wireless network, the data collection unit 202 is implemented in a User Equipment, UE, and the two connections comprise a 5G radio link and an LTE radio link. This embodiment is illustrated in FIG. 3D.

Figure 4:
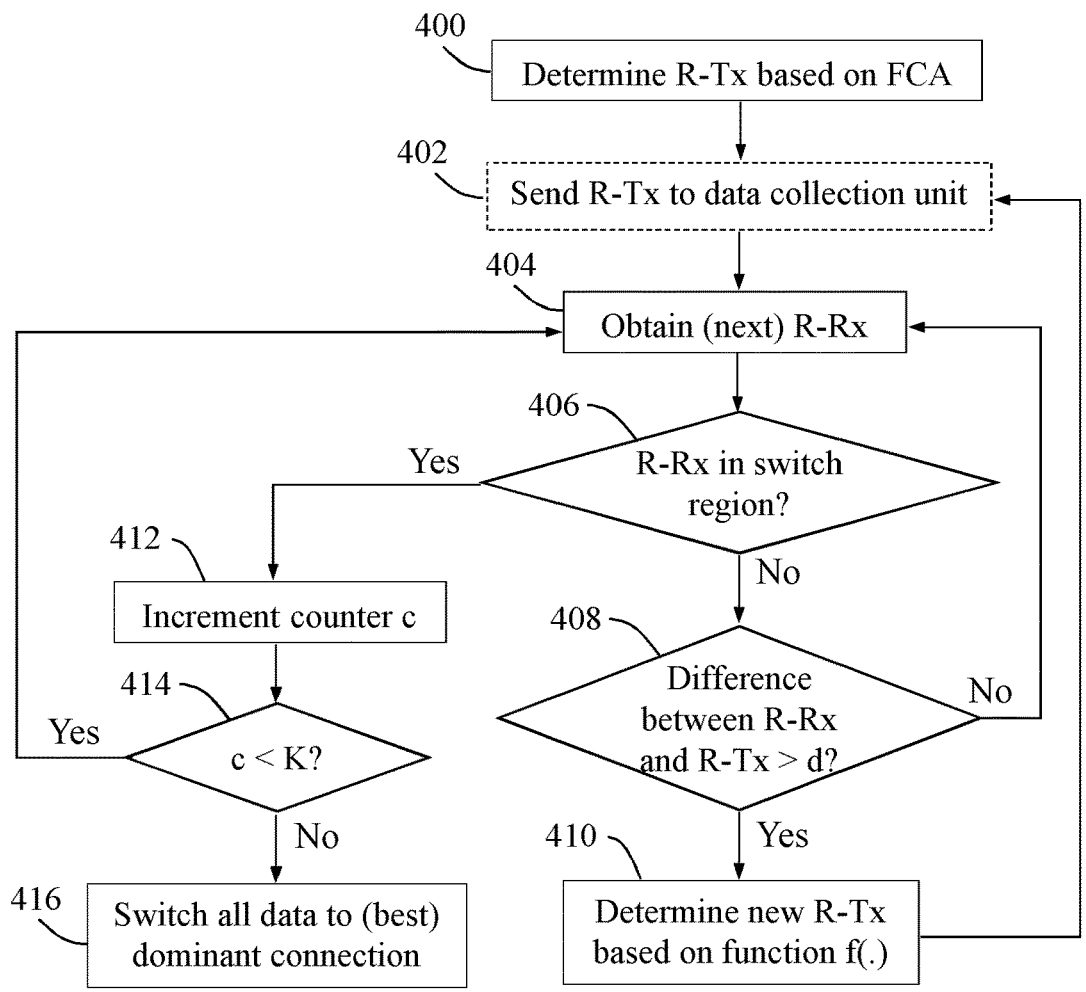
FIG. 4 is a flow chart illustrating an example of how a data split unit may operate in more detail, according to further example embodiments.

A more detailed example of how the data split unit 200 may operate in practice will now be described with reference to the flow chart in FIG. 4. As in the previous examples, it is assumed that two connections are used for communication of data from a data split unit 200 to a data collection unit 202 which is operating in a dual connection mode. A first action 300 illustrates that the data split unit 200 initially determines the R-Tx based on an FCA, which may be done according to regular procedures.

In a next action 402, the data split unit 200 may send the determined R-Tx to the data collection unit 202 as a basis for deciding whether to report a measured R-Rx or not, which has been described above. A further action 304 illustrates that the data split unit 200 obtains an R-Rx as measured and reported by the data collection unit 202, which corresponds to action 300.

It is then determined in an action 406 whether the obtained R-Rx is within a so-called "switch region" or not.

Figure 4A:
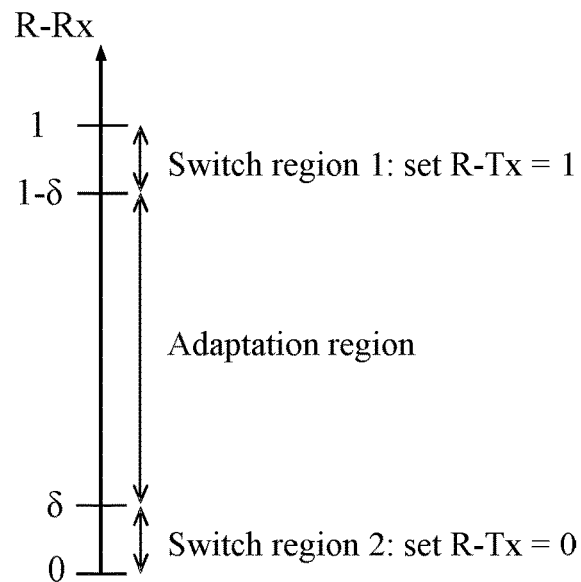
FIG. 4A is a diagram illustrating different regions of the receive split ratio R-Rx which may determine how the solution is used.

The switch region is illustrated in FIG. 4A and it basically denotes two intervals of the receive split ratio R-Rx that are adjacent to 1 and 0, respectively, where R-Rx=1 indicates that all data is received on a first connection and R-Rx=0 indicates that all data is received on a second connection. In this figure, R-Rx is close to 1 in a first switch region 1 while R-Rx is close to 0 in a second switch region 2.

It was described above that if the reported receive split ratio R-Rx is close to 1 within a margin $\delta$, it means that the first connection is dominant over the second connection, and in that case all data should be distributed to the first connection by setting the transmit split ratio R-Tx=1. On the other hand, if R-Rx is close to 0 within the margin $\delta$, it means that the second connection is dominant over the first connection, and in that case all data should be distributed, or "switched", to the second connection by setting the transmit split ratio R-Tx=0, hence the term switch region. The region between $\delta$ and $1-\delta$ is denoted the "adaptation region" to indicate that the transmit split ratio R-Tx should be adapted based on the obtained R-Rx, as described herein, if the latter is within the adaptation region. In other words, if the obtained R-Rx differs from 1 or 0 at least by the margin $\delta$, R-Rx is in the adaptation region and R-Tx should be adapted accordingly, and if not, R-Rx is in either of the switch regions 1 and 2 and R-Tx should be set to 1 or 0, respectively, as indicated in the figure.

Another action 408 illustrates that when the obtained R-Rx is in the adaptation region and not in a switch region, it is further determined whether a difference between R-Rx and the currently used R-Tx is above a minimum threshold d. If so, a new R-Tx is determined, i.e. adapted, based on the above-mentioned function f(.), in an action 410. After that, the procedure may return to action 404 for obtaining a next R-Rx. If the difference between R-Rx and R-Tx is not above the minimum threshold d, it is not necessary to determine any new R-Tx and the old one can be continually used. The procedure can in this case return from action 408 directly to action 404.

If it is determined in action 406 that the obtained R-Rx is within a switch region 1 or 2, a counter c is incremented in an action 412. It is then checked in a further action 414 if the incremented counter c is below a preset number K or not. If so, the procedure returns to action 404 for obtaining a next R-Rx. If the counter c is not below K in action 414, all data is switched (i.e. distributed) to the dominant or "best" connection in another action 416. In other words, it is required that the number of obtained R-Rx's that are in the switch region has reached K before deciding that all data should be switched to the dominant connection.

An example of how the solution may be employed in terms of actions performed by a data collection unit such as the data collection unit 202, is illustrated by the flow chart in FIG. 5 which will now be described again with further reference to FIG. 2, although this procedure is not limited to the example of FIG. 2. The actions in FIG. 5 could thus be performed for assisting control of data transmission of data from a data split unit 200 over two connections to the data collection unit 202 operating in a dual connection mode.

Figure 5:
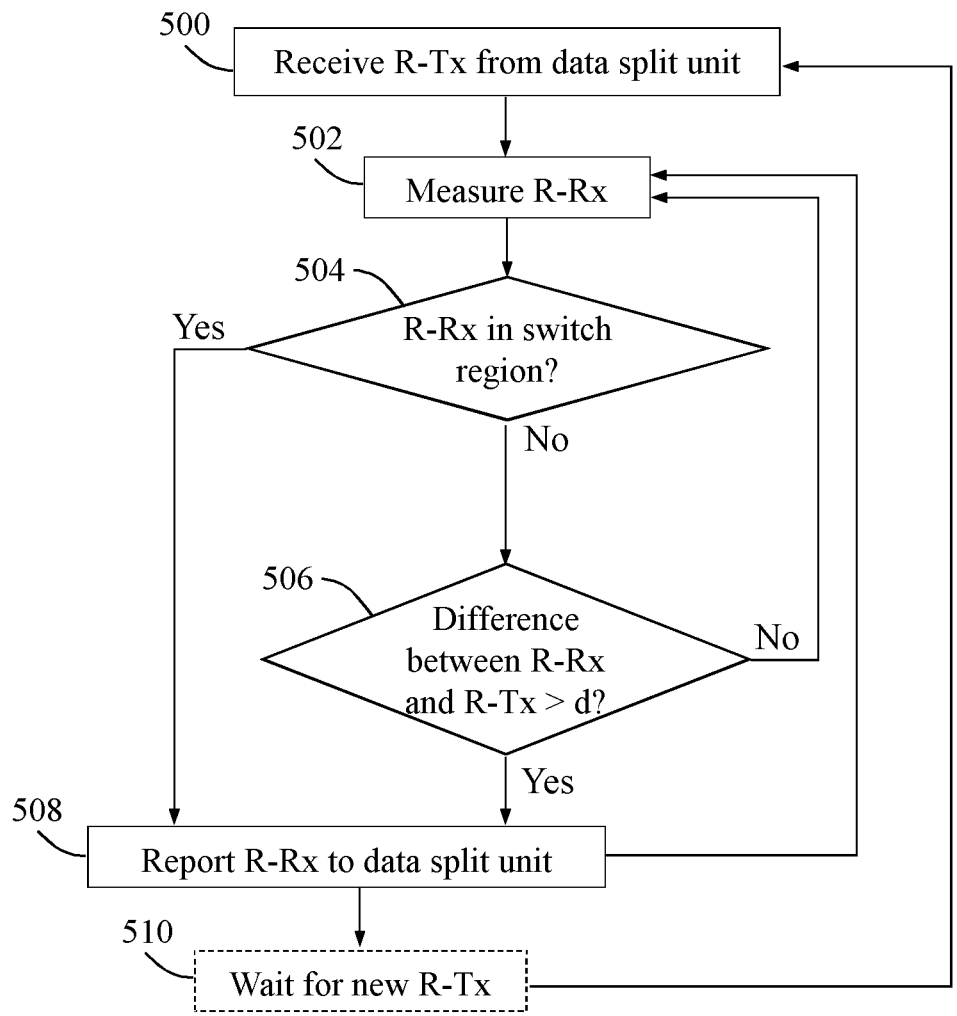
FIG. 5 is a flow chart illustrating an example of how a data collection unit may operate, according to further example embodiments.

The actions in FIG. 5 could thus be performed by the data split unit 200 which may in turn control entities or nodes used for actually transmitting the data from a "split point" such as an NGCO as shown in FIG. 1, or a network node or base station of a wireless network, or a CPE of a private network, depending on how and where the solution is employed.

A first action 500 illustrates that the data collection unit 202 receives a transmit split ratio R-Tx currently used for distributing data transmission over the two connections. As explained above, the data collection unit 202 is thereby able to decide whether to report a measured receive split ratio R-Rx or not, depending on how much it differs from the received R-Tx.

In order to acquire further basis for such a decision, the data collection unit 202 measures a receive split ratio R-Rx between the two connections as perceived at the data collection unit during the data communication, in a next action 502.

The data collection unit 202 then checks whether the measured R-Rx is in a switch region or not, in an action 504. It should be noted that this check is performed by the data collection unit 202 in this example, while it was performed by the data split unit 200 in the example of FIG. 4, in action 406. Either or both options are thus possible to employ when using the solution described herein. If the measured R-Rx is in the adaptation region and not in a switch region, the data collection unit 202 further checks whether a difference between the measured R-Rx and the R-Tx received in action 500 is above a minimum threshold d, in an action 506. If so, the data collection unit 202 reports the receive split ratio R-Rx to the data split unit 200 in an action 508, thus depending on the received transmit split ratio R-Tx, as a basis for adapting said transmit split ratio R-Tx. If not, the data collection unit 202 may continue to measure R-Rx by returning to action 502.

If it is found in action 504 that the measured R-Rx is in a switch region, the data collection unit 202 should trigger distribution (switch) of all data to the dominant connection by reporting the receive split ratio R-Rx to the data split unit 200, thus moving directly to action 508. After reporting the measured R-Rx to the data split unit 200, i.e. depending on the outcome of action 504 and/or action 506, the data collection unit 202 may continue to measure R-Rx by returning directly to action 502. Optionally, the data collection unit 202 may wait for a new R-Tx from the data split unit 200, in an action 510, and then return to action 500 instead.

The above procedure may be repeated any number of times, basically as long as the communication is ongoing. It should be noted that actions 502-506 may be repeated a substantial number of times without requiring any signalling at all, that is in case the measured R-Rx continually corresponds to the latest received R-Tx over a period of time (No in action 506) and it remains in the adaptation region (No in action 504).

In general, the following example embodiments are possible to employ in the procedure of FIG. 5. In one example embodiment, the data collection unit may decide to report the receive split ratio R-Rx when the receive split ratio R-Rx is below a predefined value δ or above 1–the predefined value δ, i.e. in a switch region. This embodiment corresponds to actions 504+508.

In another example embodiment, the data collection unit decide (506) to report the receive split ratio R-Rx when the measured receive split ratio R-Rx is above a predefined value and below 1–the predefined value δ, i.e. in the adaptation region, and a difference between the measured receive split ratio and the received transmit split ratio is above a minimum threshold d. This embodiment corresponds to actions 506+508.

Figure 6:
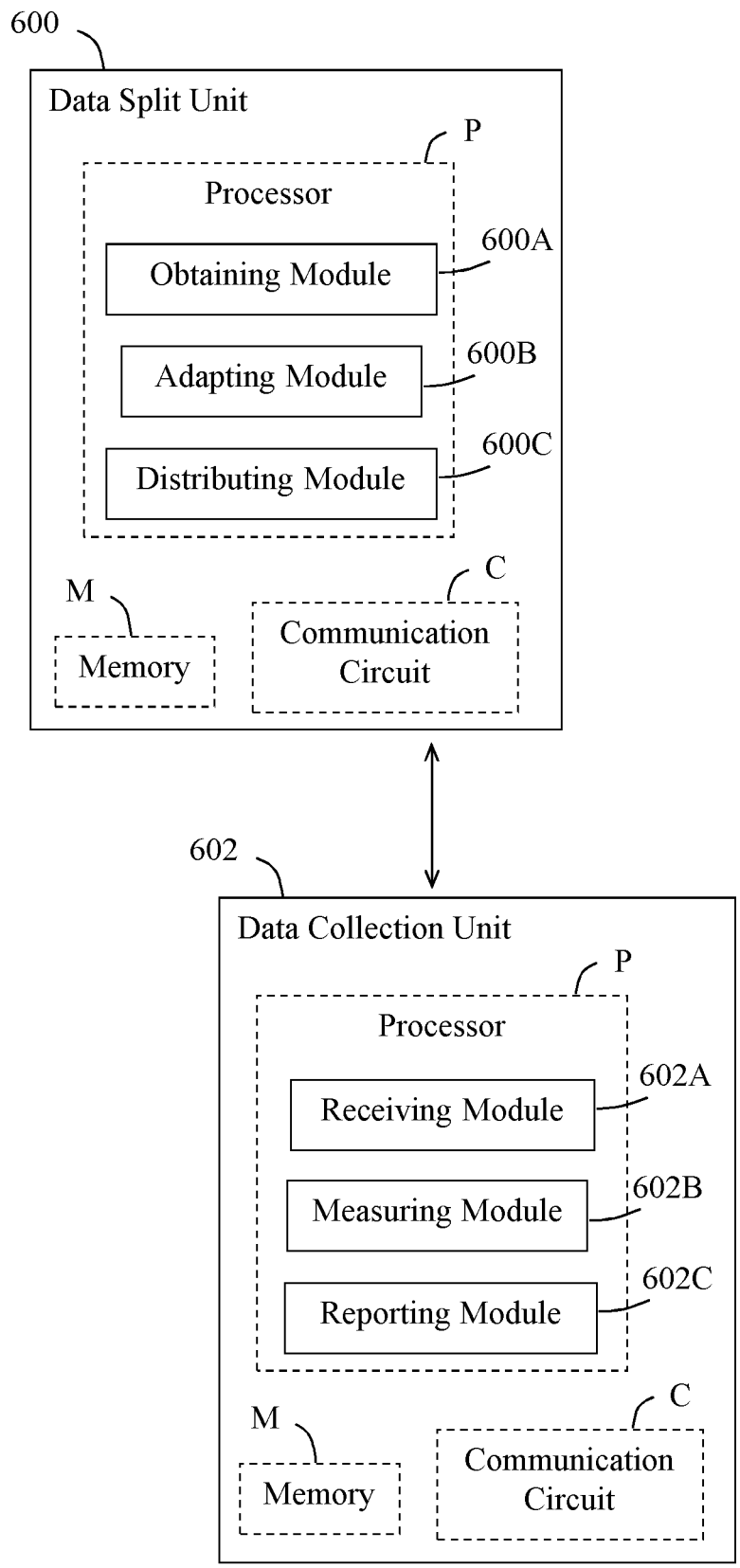
FIG. 6 is a block diagram illustrating how a data split unit and a data collection unit may be structured, according to further example embodiments.

The block diagram in FIG. 6 illustrates a detailed but non-limiting example of how a data split unit 600 and a data collection unit 602, respectively, may be structured to bring about the above-described solution and examples thereof. The data split unit 600 and the data collection unit 602 are capable of operating as opposite nodes in a communication of data over two connections, e.g. in the manner described above for FIG. 2. The data split unit 600 and the data collection unit 602 thus correspond to the data split unit 200 and the data collection unit 202, respectively, and they may be configured to operate according to any of the examples and embodiments of employing the solution as described herein, where appropriate.

Each of the data split unit 600 and the data collection unit 602 is shown to comprise a processor "P", a memory "M" and a communication circuit "C" with equipment for transmitting and receiving data in the manner described herein. The communication circuit C in each of the data split unit 600 and the data collection unit 602 thus comprises equipment configured for communication with each other using a suitable protocol for the communication depending on the implementation and on the types of connections used. The solution is however not limited to any specific types of messages or protocols.

The data split unit 600 is, e.g. by means of units, modules or the like, configured or arranged to perform the actions 300-304 in FIG. 3 and at least some of the actions 400-414 in FIG. 4 and as follows. Further, the data collection unit 602 is, e.g. by means of units, modules or the like, configured or arranged to perform at least some of the actions 500-510 in FIG. 5 and as follows.

The data split unit 600 is arranged to control data transmission over two connections used for communication of data from the data split unit to a data collection unit 602 operating in a dual connection mode.

The data split unit 600 is configured to obtain a receive split ratio R-Rx between the two connections as perceived at the data collection unit during the data communication. This obtaining operation may be performed by an obtaining module 600A in the data split unit 600, as illustrated in action 300. The obtaining module 600A could alternatively be named a receiving module or a discovering module.

The data split unit 600 is also configured to adapt a transmit split ratio R-Tx for distributing data transmission over the two connections, based on the obtained receive split ratio. This adapting operation may be performed by an adapting module 600B in the data split unit 600, as illustrated in action 302. The adapting module 600B could alternatively be named a logic module, a controlling module or an adjusting module.

The data split unit 600 is further configured to distribute transmission of data to the data collection unit over the two connections according to the adapted transmit split ratio R-Tx, which may be performed by a distributing module 600C in the data split unit 600, as illustrated in action 304. The distributing module 600C could alternatively be named a transmitting module.

The data collection unit 602 is arranged to assist control of data transmission of data from a data split unit 600 over two connections to the data collection unit operating in a dual connection mode.

The data collection unit 602 is configured to receive a transmit split ratio R-Tx currently used for distributing data transmission over the two connections. This operation may be performed by a receiving module 602A in the data collection unit 602 as illustrated in action 500. The receiving module 602A could alternatively be named an obtaining module.

The data collection unit 602 is also configured to measure a receive split ratio R-Rx between the two connections as perceived at the data collection unit during the data communication. This measuring operation may be performed by a measuring module 602B in the data collection unit 602, as illustrated in action 502. The measuring module 602B could alternatively be named a determining module.

The data collection unit 602 is further configured to report the receive split ratio R-Rx to the data split unit 600, depending on the received transmit split ratio R-Tx, as a basis for adapting said transmit split ratio R-Tx. This reporting operation may be performed by a reporting module 602C in the data collection unit 602, as illustrated in action 310. The reporting module 602C could alternatively be named a sending or transmitting module.

It should be noted that FIG. 6 illustrates various functional modules in the data split unit 600 and the data collection unit 602, respectively, and the skilled person is able to implement these functional modules in practice using suitable software and hardware equipment. Thus, the solution is generally not limited to the shown structures of the data split unit 600 and the data collection unit 602, and the functional modules therein may be configured to operate according to any of the features, examples and embodiments described in this disclosure, where appropriate.

The functional modules 600A-C and 602A-C described above may be implemented in the data split unit 600 and the data collection unit 602, respectively, by means of program modules of a respective computer program comprising code means which, when run by the processor P causes the data split unit 600 and the data collection unit 602 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the data split unit 600 and the data collection unit 602 in the form of a memory M having a computer readable medium and being connected to the processor P. The computer program product or memory M in each of the data split unit 600 and the data collection unit 602 thus comprises a computer readable medium on which the computer program is stored e.g. in the form of computer program modules or the like. For example, the memory M in each unit may be a flash memory, a Random-Access Memory (RAM), a Read-Only Memory (ROM) or an Electrically Erasable Programmable ROM (EEPROM), and the program modules could in alternative implementations be distributed on different computer program products in the form of memories within the respective data split unit 600 and data collection unit 602.

The solution described herein may be implemented in each of the data split unit 600 and the data collection unit 602 by a computer program comprising instructions which, when executed on at least one processor, cause the at least one processor to carry out the actions according to any of the above embodiments and examples, where appropriate. The solution may also be implemented at each of the data split unit 600 and the data collection unit 602 in a carrier containing the above computer program, wherein the carrier is one of an electronic signal, optical signal, radio signal, or computer readable storage medium.

While the solution has been described with reference to specific exemplifying embodiments, the description is generally only intended to illustrate the inventive concept and should not be taken as limiting the scope of the solution. For example, the terms "data split unit", "data collection unit", "receive split ratio", "transmit split ratio", "switch region", "adaptation region" and "dual connection mode" have been used throughout this disclosure, although any other corresponding entities, functions, and/or parameters could also be used having the features and characteristics described here. The solution is defined by the appended claims.

The invention claimed is:

1. A method for controlling data transmission over two connections used for communication of data from a data split unit to a data collection unit operating in a dual connection mode, the method comprising:
   obtaining a receive split ratio between the two connections as perceived at the data collection unit during the data communication,
   adapting a transmit split ratio for distributing data transmission over the two connections based on the obtained receive split ratio, and
   distributing transmission of data to the data collection unit over the two connections according to the adapted transmit split ratio.

2. The method of claim 1, wherein the transmit split ratio is adapted so that a difference between the transmit split ratio and the obtained receive split ratio is reduced or eliminated.

3. The method of claim 2, wherein the transmit split ratio is adapted only if said difference is above a minimum threshold.

4. The method of claim 1, wherein if the obtained receive split ratio is below a predefined value $\delta$ or above 1−the predefined value $\delta$, indicating that the two connections include a dominant connection and a non-dominant connection, the transmit split ratio is set to zero or 1 so that the non-dominant connection is deactivated and only the dominant connection is used.

5. The method of claim 1, wherein the transmit split ratio is adapted by applying a predefined function f(.) on the obtained receive split ratio.

6. The method of claim 5, wherein the predefined function f(.) requires that the adapted transmit split ratio is equal to the obtained receive split ratio.

7. The method of claim 1, further comprising sending the adapted transmit split ratio to the data collection unit as a basis for deciding whether to report a next receive split ratio or not.

8. The method of claim 1, wherein the method is performed when the data split unit is implemented in a Next Generation Central Office (NGCO), the data collection unit is implemented in a Customer Premises Equipment (CPE), and the two connections comprise a 5G radio access network and a Legacy Fixed Network (LFN).

9. The method of claim 1, wherein the method is performed when the data split unit is implemented in a Customer Premises Equipment (CPE), the data collection unit is implemented in a User Equipment (UE), and the two connections comprise a 3GPP radio link and a WiFi link.

10. The method of claim 1, wherein the method is performed when the data split unit is implemented in a Next Generation Central Office (NGCO), the data collection unit is implemented in a User Equipment (UE), and the two connections comprise an LTE radio link and a WiFi link.

11. The method of claim 1, wherein the method is performed when the data split unit is implemented in a base station of a wireless network, the data collection unit is implemented in a User Equipment (UE), and the two connections comprise a 5G radio link and an LTE radio link.

12. A data split apparatus arranged to control data transmission over two connections used for communication of data from the data split apparatus to a data collection unit operating in a dual connection mode, wherein the data split apparatus is configured to:

obtain a receive split ratio R-Rx between the two connections as perceived at the data collection unit during the data communication, adapt a transmit split ratio R-Tx for distributing data transmission over the two connections based on the obtained receive split ratio, and distribute transmission of data to the data collection unit over the two connections according to the adapted transmit split ratio R-Tx.

13. The data split apparatus of claim 12, wherein the data split apparatus is configured to adapt the transmit split ratio so that a difference between the transmit split ratio and the obtained receive split ratio is reduced or eliminated.

14. The data split apparatus of claim 13, wherein the data split apparatus is configured to adapt the transmit split ratio only if said difference is above a minimum threshold d.

15. The data split apparatus of claim 12, wherein if the obtained receive split ratio is below a predefined value δ or above 1−the predefined value δ, indicating that the two connections include a dominant connection and a non-dominant connection, the data split apparatus is configured to set the transmit split ratio to zero or 1 so that the non-dominant connection is deactivated and only the dominant connection is used.

16. A method performed by a data collection unit for assisting control of data transmission of data from a data split unit over two connections to the data collection unit operating in a dual connection mode, the method comprising:

receiving a transmit split ratio currently used for distributing data transmission over the two connections, measuring a receive split ratio between the two connections as perceived at the data collection unit during the data communication, and reporting the receive split ratio to the data split unit, depending on the received transmit split ratio, as a basis for adapting said transmit split ratio.

17. The method of claim 16, wherein the data collection unit decides to report the receive split ratio when the measured receive split ratio is below a predefined value δ or above 1−the predefined value δ.

18. The method of claim 16, wherein the data collection unit decides to report the receive split ratio when the measured receive split ratio is above a predefined value δ and below 1−the predefined value δ, and a difference between the measured receive split ratio and the received transmit split ratio is above a minimum threshold d.

19. A data collection apparatus arranged to assist control of data transmission of data from a data split unit over two connections to the data collection unit operating in a dual connection mode, wherein the data collection unit is configured to:

receive a transmit split ratio currently used for distributing data transmission over the two connections, measure a receive split ratio between the two connections as perceived at the data collection unit during the data communication, and report the receive split ratio to the data split unit, depending on the received transmit split ratio, as a basis for adapting said transmit split ratio.

20. The data collection apparatus of claim 19, wherein the data collection apparatus is configured to report the receive split ratio when the measured receive split ratio is below a predefined value δ or above 1−the predefined value δ.

* * * * *